United States Patent
Bauchspies

(10) Patent No.: US 9,805,247 B2
(45) Date of Patent: Oct. 31, 2017

(54) PATTERN REGISTRATION

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 0 days.

(21) Appl. No.: 15/053,093

(22) Filed: Feb. 25, 2016

(65) Prior Publication Data

US 2016/0253547 A1 Sep. 1, 2016

Related U.S. Application Data

(60) Provisional application No. 62/126,236, filed on Feb. 27, 2015.

(51) Int. Cl.
*G06K 9/62* (2006.01)
*G06K 9/00* (2006.01)

(52) U.S. Cl.
CPC ..... *G06K 9/00087* (2013.01); *G06K 9/00013* (2013.01); *G06K 9/00926* (2013.01)

(58) Field of Classification Search
USPC ....... 382/124, 218, 219, 209, 154, 106, 283, 382/245, 112; 156/351, 358; 348/86; 358/394
See application file for complete search history.

(56) References Cited

U.S. PATENT DOCUMENTS

| | | |
|---|---|---|
| 4,573,201 A | 2/1986 | Hashiyama et al. |
| 5,799,098 A | 8/1998 | Ort et al. |
| 5,845,005 A | 12/1998 | Setlak et al. |
| 5,909,501 A | 6/1999 | Thebaud |
| 5,926,555 A | 7/1999 | Ort et al. |
| 6,241,288 B1 | 6/2001 | Bergenek et al. |
| 6,285,789 B1 | 9/2001 | Kim |
| 6,546,122 B1 | 4/2003 | Russo |
| 6,795,569 B1 | 9/2004 | Setlak |
| 6,836,554 B1 | 12/2004 | Bolle et al. |
| 6,895,104 B2 | 5/2005 | Wendt et al. |
| 7,027,626 B2 | 4/2006 | Funada |
| 7,142,699 B2 | 11/2006 | Reisman et al. |
| 7,203,347 B2 | 4/2007 | Hamid |
| 7,236,617 B1 | 6/2007 | Yau et al. |
| 7,330,572 B2 | 2/2008 | Uchida |
| 7,512,256 B1 | 3/2009 | Bauchspies |

(Continued)

FOREIGN PATENT DOCUMENTS

| | | |
|---|---|---|
| EP | 1071034 A2 | 1/2001 |
| EP | 1183638 A1 | 3/2002 |
| WO | 2016/135706 A1 | 9/2016 |

OTHER PUBLICATIONS

Anil Jain et aL, "Fingerprint Mosaicking" Proceedings of IEEE International Conference on Acoustics, Speech, and Signal Processing (ICASSP), Orlando, Florida, May 13-17, 2002.

(Continued)

*Primary Examiner* — Anh H Do
(74) *Attorney, Agent, or Firm* — Patent Law Offices of Michael E. Woods; Michael E. Woods

(57) ABSTRACT

A system, method, and computer program product for automatic machine-implemented pattern registration, particularly suited to small sensor systems which include a reduced image capture area size relative to the pattern being sensed.

30 Claims, 3 Drawing Sheets

(56) References Cited

U.S. PATENT DOCUMENTS

| | | | |
|---|---|---|---|
| 7,574,022 B2 | 8/2009 | Russo | |
| 7,599,530 B2 | 10/2009 | Boshra | |
| 7,616,787 B2 | 11/2009 | Boshra | |
| 7,643,660 B1 | 1/2010 | Bauchspies | |
| 7,773,799 B2 * | 8/2010 | Oldroyd | G01C 11/00 382/106 |
| 7,787,667 B2 | 8/2010 | Boshra | |
| 7,912,256 B2 | 3/2011 | Russo | |
| 7,970,186 B2 | 6/2011 | Bauchspies | |
| 8,107,722 B2 * | 1/2012 | Oldroyd | G01C 11/00 382/106 |
| 8,295,561 B2 | 10/2012 | Kwan | |
| 2007/0263912 A1 | 11/2007 | Biarnes et al. | |
| 2014/0003681 A1 | 1/2014 | Wright et al. | |
| 2016/0253547 A1 | 9/2016 | Bauchspies | |

OTHER PUBLICATIONS

Arun Ross et al., "Image Versus Feature Mosaicing: A Case Study in Fingerprints" Proc. of SPIE Conference on Biometric Technology for Human Identification III, (Orlando, USA), pp. 620208-1-620208-12, Apr. 2006.

Biagio Freni et al: "Replacement Algorithms for Fingerprint Template Update", Jun. 25, 2008 (Jun. 25, 2008), Image Analysis and Recognition; [Lecture Notes in Computer Science], Springer Berlin Heidelberg, Berlin, Heidelberg, p. 884-893, XP019091350, ISBN: 978-3-540-69811-1.

Duda R et al: "Pattern Classification, Graph-Theoretic Methods", Jan. 1, 2001 (Jan. 1, 2001), Pattern Classification, New York, John Wiley & Sons, US, pp. 566-567, XP002282413, ISBN: 978-0-471-05669-0.

International Search Report for International application No. PCT/IB2016/051092.

Koichi Ito, et al., "A Fingerprint Matching Algorithm Using Phase-Only Correlation", IEICE Trans. Fundamentals, vol. E87-A, No. 3, Mar. 2004.

Koichi Ito, et al., "A Fingerprint Recognition Algorithm Combining Phase-Based Image Matching and Feature-Based Matching" D. Zhang and A.K. Jain (Eds.) ICB 2005, LNCS 3832, pp. 316-325, 2005 (C) Springer-Verlag Berlin, Heidelberg 2005.

Koichi Ito, et al., "A Fingerprint Recognition Algorithm Using Phase-Based Image Matching for Low-Quality Fingerprints" 0-7803-9134-9/05/$20.00 (C) 2005 IEEE.

Liu C N: "Reference Design Procedure for Signature Verification", IBM Technical Disclosure Bulletin, International Business Machines Corp. (Thornwood), US, vol. 21, No. 1, Jun. 1, 1978 (Jun. 1, 1978), p. 426/427, XP002050797, ISSN: 0018-8689.

Sandhya Tarar et al., "Fingerpring Mosaicking Algorithm to Improve the Performance of Fingerprint Matching System" Computer Science and Information Technology 2(3): 142-151, 2014.

Takuji Maeda et al: "Characteristics of the Identification Algorithm Using a Matching Score Matrix", Jul. 15, 2004 (Jul. 15, 2004), Biometric Authentication; [Lecture Notes in Computer Science;;LNCS], Springer-Verlag, Berlin/Heidelberg, pp. 330-336, XP019007755, ISBN: 978-3-540-22146-3.

Uludag U et al: "Biometric template selection and update: a case study in fingerprints", Pattern Recognition Elsevier, GB, vol. 37, No. 7, Jul. 1, 2004 (Jul. 1, 2004), pp. 1533-1542, XP004508402, ISSN: 0031-3203, DOI: 10.1016/J.PATCOG.2003.11.012.

Written Opinion of the International Searching Authority for International application No. PCT/IB2016/051092.

Y.S. Moon et al., "Template Synthesis and Image Mosaicking for Fingerprint Registration: An Experimental Study" 0-7803-8484-9/04/$20.00 (C) 2004 IEEE.

* cited by examiner

|   | 1 | 2 | ... | N |
|---|---|---|---|---|
| 1 |   | MATCH |   | MATCH |
| 2 | MATCH |   |   | NO MATCH |
| ... |   |   |   |   |
| N | MATCH | NO MATCH |   |   |

|   | 1 | 2 | ... | N | N + 1 |
|---|---|---|---|---|---|
| 1 |   | MATCH |   | MATCH | NO MATCH |
| 2 | MATCH |   |   | NO MATCH | NO MATCH |
| ... |   |   |   |   |   |
| N | MATCH | NO MATCH |   |   | NO MATCH |
| N + 1 | NO MATCH | NO MATCH |   | NO MATCH |   |

|   | 1 | 2 | ... | N | N + 1 | N + 2 |
|---|---|---|---|---|---|---|
| 1 |   | MATCH |   | MATCH | NO MATCH | NO MATCH |
| 2 | MATCH |   |   | NO MATCH | NO MATCH | NO MATCH |
| ... |   |   |   |   |   |   |
| N | MATCH | NO MATCH |   |   | NO MATCH | MATCH |
| N + 1 | NO MATCH | NO MATCH |   | NO MATCH |   | MATCH |
| N + 2 | NO MATCH | NO MATCH |   | MATCH | MATCH |   |

PATTERN REGISTRATION

CROSS REFERENCE TO RELATED APPLICATIONS

This application claims benefit of U.S. Patent Application No. 62/126,236 filed 27 Feb. 2015, the contents of which are hereby expressly incorporated by reference thereto in its entirety.

FIELD OF THE INVENTION

The present invention relates generally to automatic machine-implemented pattern registration, processing, and/or analysis, and more specifically, but not exclusively, to systems, methods, and computer program products for biometric, e.g., fingerprint, registration.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many pattern identification, verification, and recognition systems include a service in which a test pattern is compared against a reference database of authorized patterns. Systems and methods supporting these comparisons offer a trusted mode in which patterns are registered into the reference database to become authorized patterns.

Depending upon the nature of the pattern source and other implementations of the registration process, it is possible that one or more of the patterns that are attempted to be registered are actually invalid or otherwise improperly submitted for registration during the trusted mode.

For example, some patterns to be submitted into the reference database during the trusted mode registration are sourced using a sensor that has a pattern capture area size smaller than a characteristic dimension of the pattern to be captured. Sometimes the pattern source is changed during the registration process. Determining in real-time during the trusted registration process whether all captured patterns are from the same pattern source becomes more challenging as the pattern capture area size decreases.

Some conventional systems accept all submitted patterns during the trusted mode registration process. When one or more of the submitted patterns are invalid or improper patterns (e.g., a pattern from a different or an unauthorized pattern source), any subsequent pattern identification, verification, and/or recognition system employing the reference database including those invalid or improper patterns may be compromised or degraded.

Pattern identification, verification, and/or recognition systems are increasingly becoming gateways to significant personal and economic data and it is desirable to improve reliability and accuracy of these gateways. Improving the registration process, such as by preventing or reducing any opportunity for invalid or unauthorized data to be included in the reference database, is one way to improve reliability and accuracy.

BRIEF SUMMARY OF THE INVENTION

Disclosed is a system, method, and computer program product for improving pattern registration. The following summary of the invention is provided to facilitate an understanding of some of technical features related to pattern registration, and is not intended to be a full description of the present invention. A full appreciation of the various aspects of the invention can be gained by taking the entire specification, claims, drawings, and abstract as a whole. The present invention is applicable to other pattern source registration systems in addition to systems and methods for biometric pattern registration (e.g., fingerprint, facial recognition, retinal scans, and the like). The pattern representations may include one or more images, information extracted or derived from one or more images, and combinations thereof.

Some embodiments of the present invention address addition of fingerprint patterns sourced from a user in a reference database during a trusted mode registration. The fingerprint patterns are sourced using a fingerprint sensor, scanner, reader, or the like. The registration process has access to a pattern matcher system and method, such as used during non-registration operation of the system in comparing a test pattern against the reference database of authorized images.

A disclosed embodiment of the present invention used for fingerprint registration accepts N number of fingerprint patterns, N an integer, preferably greater than 1, and more preferably in the range 2-40. As each fingerprint pattern is entered into the registration system, the pattern matcher system is used to determine which, if any, of the previously entered fingerprint patterns are matched. A matrix records results of these comparisons. When a quality of match value, for example the number of matches versus the total number of fingerprint patterns, exceeds a threshold then registration of the matching fingerprint patterns is accepted. The threshold may be any value appropriate for the implementation, such as N/2. Non-matching fingerprint patterns may be discarded or reserved with a flag or other indicia indicating that the non-matching fingerprint patterns are not acceptable for use during tests into the reference database.

Some embodiments may include a match matrix associated with a set of pattern representations, and included within a data container of the representations and matrix. The matrix may contain a status identifier associated with each representation within the container, for example, a MATCH or a NON-MATCH status among other indications. An embodiment may use the matrix for processing the set of pattern representations, including, for example, when adding new representations into the data container (which may also increase a size of the match matrix).

Also disclosed is an embodiment including a dynamic registration system in which additional fingerprint patterns may be added later into the registration database. Once the trusted registration mode is enabled, each additional fingerprint pattern submitted is again compared to all pre-existing fingerprint patterns in the registration database. Additional entries are recorded into the matrix reflecting the new comparisons. A new quality of match value for the entire matrix is determined and compared to the threshold. Registration may be successful with the new fingerprint patterns or the registration system may request additional fingerprint patterns. All fingerprint patterns that match the set of fingerprint patterns that meet the threshold are identified as valid fingerprint patterns in the registration database.

A machine-implemented method for organizing a set of data derived from an N number of pattern representations from one or more single pattern sources, N>1, including a) producing from the set of data, a first reference list identifying the N number of pattern representations $I_k$, k=1 to N, stored in a memory structure; b) applying, responsive to the first reference list, a machine-implemented pattern matcher process to a first set of pairs of the pattern representations wherein the first set of pairs of the pattern representations includes a number M of unique two-combinations of the plurality of pattern representations taken two at a time, the applying step b) producing a MATCH result for each the unique two-combination when the unique two-combination is determined by the machine-implemented pattern matcher to match each other within a first predetermined level of confidence; c) recording each the MATCH result into the memory structure including a match matrix; and d) determining a total number of the MATCH results stored in the match matrix.

An apparatus for organizing a set of data derived from an N number of pattern representations from one or more single pattern sources, N>1, including a pattern collector producing the N number of pattern representations; and a processing system, coupled to the pattern collector, including a processor and a memory coupled to the processor, the memory storing a plurality of computer executable instructions wherein the processor executes the plurality of computer executable instructions to perform a method, including producing from the set of data, a first reference list identifying the N number of pattern representations $I_k$, k=1 to N, stored in a memory structure; applying, responsive to the first reference list, a machine-implemented pattern matcher process to a first set of pairs of the pattern representations wherein the first set of pairs of the pattern representations includes a number M of unique two-combinations of the plurality of pattern representations taken two at a time, the applying step b) producing a MATCH result for each the unique two-combination when the unique two-combination is determined by the machine-implemented pattern matcher to match each other within a first predetermined level of confidence; recording each the MATCH result into the memory structure including a match matrix; and determining a total number of the MATCH results stored in the match matrix.

A non-transitory computer readable medium with computer executable instructions stored thereon executed by a processor to perform the method of organizing a set of data derived from an N number of pattern representations from one or more single pattern sources, N>1, the method including producing from the set of data, a first reference list identifying the N number of pattern representations $I_k$, k=1 to N, stored in a memory structure; applying, responsive to the first reference list, a machine-implemented pattern matcher process to a first set of pairs of the pattern representations wherein the first set of pairs of the pattern representations includes a number M of unique two-combinations of the plurality of pattern representations taken two at a time, the applying step b) producing a MATCH result for each the unique two-combination when the unique two-combination is determined by the machine-implemented pattern matcher to match each other within a first predetermined level of confidence; recording each the MATCH result into the memory structure including a match matrix; and determining a total number of the MATCH results stored in the match matrix.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 3-FIG. 5 illustrate a sequence of registration matrices;

FIG. 3 illustrates a first registration matrix resulting from an initial registration of an N number of images;

FIG. 4 illustrates a second registration matrix resulting from an addition of a first additional image into the first registration matrix illustrated in FIG. 3; and FIG. 5 illustrates a second registration matrix resulting from an addition of a second additional image into the second registration matrix illustrated in FIG. 4.

DETAILED DESCRIPTION OF THE INVENTION

Figure 1:
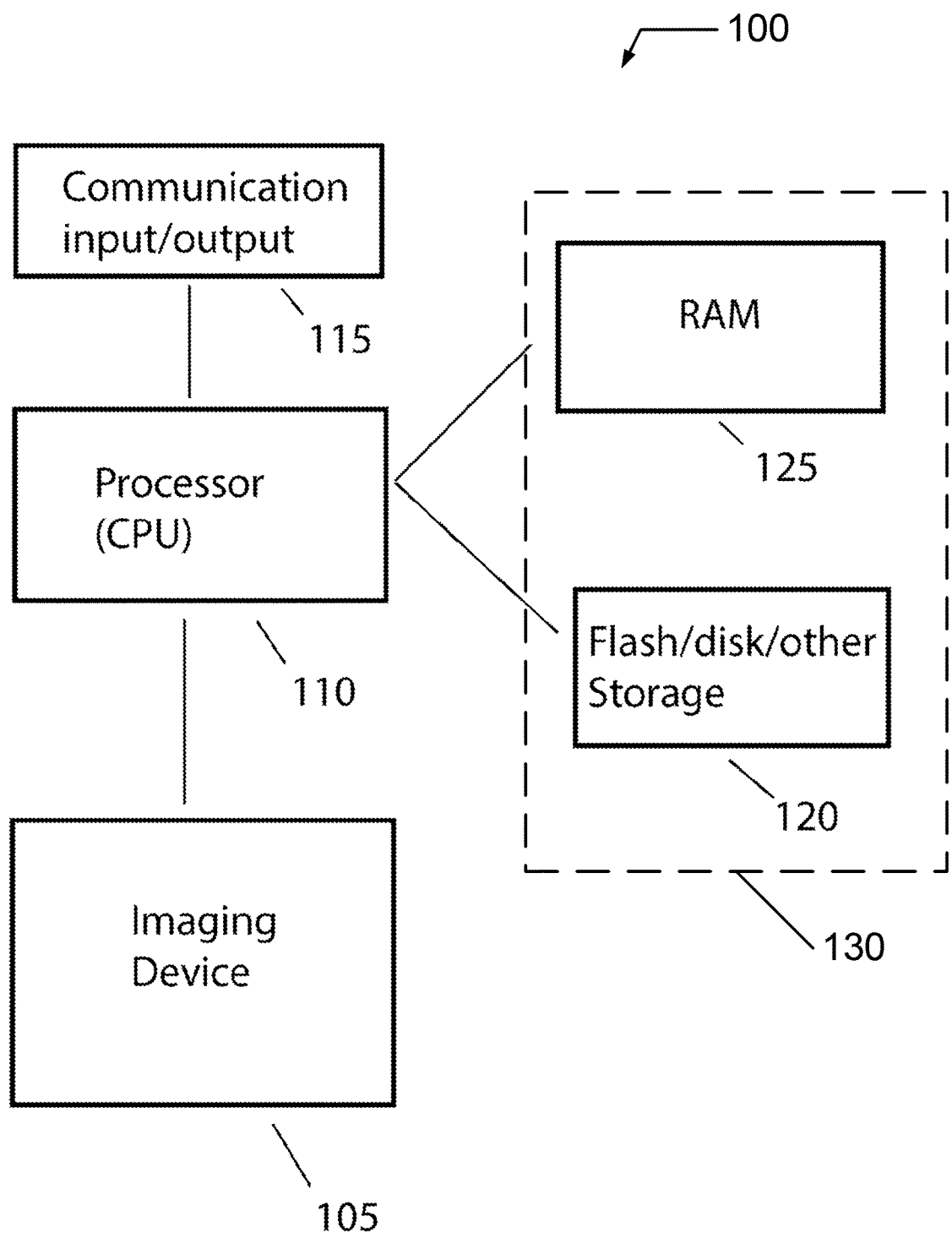
FIG. 1 illustrates a block schematic diagram of an embodiment for a fingerprint verification system.

Embodiments of the present invention provide a system, method, and computer program product for improving pattern registration. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting elements, e.g., amplitude, from a pattern source. As such, a ridge/furrow pattern on a human finger is included as a fingerprint. Additionally, zebra stripe patterns, retinal vein patterns, or other collections of contrasting elements having a set of a plurality of sufficiently long succession of similarly contrasted elements.

FIG. 1 illustrates a block schematic diagram of an embodiment for a fingerprint verification system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint verification system as opposed to some other type of fingerprint checking/matching system. In a fingerprint verification system, the system attempts to measure a correspondence between a pair of fingerprints (one-on-one) in order to establish, within some level of confidence, whether one pattern source of one fingerprint is the same or sufficiently close as a pattern source of the other fingerprint. This is contrasted with an identification system that determines which pattern source generated a particular fingerprint. A verification system may be used as an identification system when a decrease in power/speed is acceptable, given fixed resources.

System 100 may function as a basic computer in implementing the present invention for accessing and processing fingerprints, fingerprint images, and sets of curves derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint; either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a general purpose computer having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from source 105. In some cases, system 100 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of the system. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Source 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices are also connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring data, for example images, maps, instructions, or programs.

In use, system 100 tests a set of images, such as a plurality of fingerprint image portions from a live finger, against each other to determine which images "match"—system 100 has access to a matcher for this process. There are many different pattern match systems and method that may be employed including a matching system and method as described in U.S. Pat. No. 7,643,660 and U.S. Pat. No. 7,970,186. These patents are hereby expressly incorporated by reference thereto in their entireties for all purposes. Some match systems and methods allow for a lower confidence level (e.g., a relaxed security requirement) match test in some circumstances. Matching candidate images during registration with system 100 in a trusted mode may make use of such a lower confidence level match test.

Figure 2:
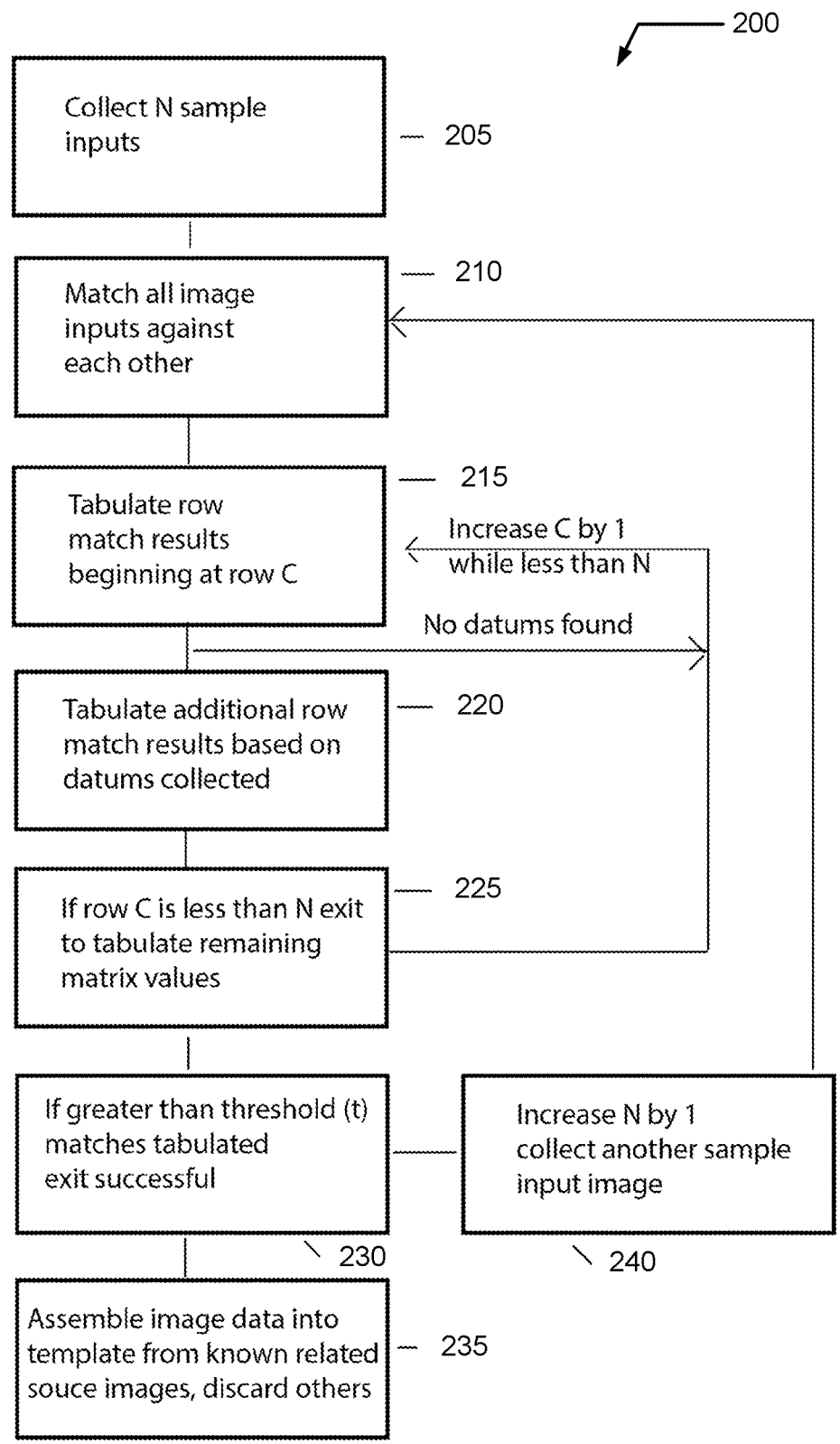
FIG. 2 illustrates a pattern registration process that produces a registration matrix.

FIG. 2 illustrates a pattern registration process 200 that produces a registration matrix, such as illustrated in FIG. 3-FIG. 5. FIG. 3-FIG. 5 illustrate a sequence of registration matrices produced by process 200 illustrated in FIG. 2. FIG. 3 illustrates a first registration matrix 300 resulting from an initial registration of an N number of images; FIG. 4 illustrates a second registration matrix 400 resulting from an addition of a first additional image into first registration matrix 300; and FIG. 5 illustrates a third registration matrix 500 resulting from an addition of a second additional image into second registration matrix 400.

Pattern registration process 200 includes steps 205-250 and may be executed using system 100. Process 200 begins at step 205 and collects N number of sample inputs, such as from imaging device 105 during a registration mode of system 100. N being an integer, preferably greater than 1, and more preferably in the range 2-40.

Process 200 uses the matcher to compare the N number of sample inputs against each other at step 210. Depending upon resources of system 100, the matcher may wait until all N number of sample inputs have been received or begin matching with the input of the second or later sample input. In the disclosed embodiments, matching is commutative in the sense that sample 1 matching sample 2 means sample 2 matches sample 1. The matcher is not used in such "reverse" tests. Also, in the disclosed embodiments, an input sample is not matched against itself. Some embodiments may run matcher against the same sample image.

For example, sample input 1 is compared to sample input X, X=2 to N. Then sample input 2 is compared to sample input X, X=3 to N, and then sample input 3 is compared to sample input X, X=4 to N. This sequence is continued to sample input N−1 which is compared to sample input N.

After step 210, process 200 next performs step 215 to build first registration matrix 300 by tabulating match results of the sample image comparisons. In matrix 300, a "match" in a position $P_{i,j}$, i≠j, i=1 to N and j=1 to N, indicates that the $i^{th}$ sample input successfully matched the $j^{th}$ sample input. (And because of the commutative property, the $j^{th}$ sample input also matches the $i^{th}$ input sample so "match is also recorded at $P_{j,i}$.) No value for an element of a registration matrix indicates either an unsuccessful match or a match was not conducted, such as for elements $P_{i,j}$,i=j. In other words, the process compares unique two-combinations of the data to be matched (taken two at a time). A maximum number of unique two-combinations of N items taken two at time is (N*(N−1))/2. Some embodiments may not include the maximum number for any/all uses.

Step 215 of the disclosed embodiment begins at row 1 of first registration matrix 300. All "matches" in row C (C=1 initially) are tabulated by accessing the values in the columns of row 1. For the following discussion, N is set to 3 to simplify the visualization and explanation. In actual practice N may vary as noted herein. Thus, for first registration matrix 300, the tabulated data produce an image link list of "2" and "N" for row C=1. A short hand for this is {2, N}.

At step 220, after step 215, tabulation proceeds to the rows matching the data added into the image link list— namely row 2 and row N. Row 2 has a match datum in column 1, thus "1" is added into the image link list which is now {2, N, 1}. Row N, also from the tabulation from row 1, also includes datum "N" which is already in the image link list. Duplicate data are not added into the image link list.

Process 200 performs a test at step 225 checking whether a current value of C is less than N. When true, the test at step 225 increments C by 1 and then returns to step 215. For N=3, step 215 and step 220 are performed twice, scanning first registration matrix 300 for new linking data to add to the image link list {2, N, 1}. In this case, no new non-duplicate data are found and the image link list is not further changed.

At the third processing of the test at step 225, C has been incremented to 3 which means the test is now true. Process 200 then advances to step 230 to test the number of data in the image link list against a predetermined threshold T. In the present example, the number of data is three, indicating that all the sample images are from the same source.

For the case when threshold T is three or less, process 200 advances to step 235 as the registration has met its objective and can stop. A template is created by selecting all the required data associated with the pattern sources associated with the data in the image link list. Images associated with data not in the image link list did not contribute to the template and may be discarded.

For the case when the threshold is four or more, the test at step 230 fails and process 200 performs step 240. Step 240 increases N by 1 and collects a new image sample N+1. Thereafter process 200 returns to step 210 continue the match of the new N+1 sample.

The second registration matrix 400 illustrates the result of adding new image sample N+1 into the registration process. In this example, image sample N+1 does not match any of the other image samples. The image link list is unchanged by the addition of new image sample N+1. The test at step 230 still fails for a threshold of 4 or more.

Process 200 then performs step 240 again to obtain another new image sample N+2 and returns to step 210. Third registration matrix 500 illustrates the result of adding new image sample N+2 into the registration process. In this example, image N and image N+1 match the new image sample N+2. Process 200 performs step 215-step 225 and adds 2 data into the image link list: datum N+2 from the tabulation of row N, and datum N+1 from the subsequent tabulation of row N+2. The image link list is now {2, N, 1, N+2, N+1} which then represents all the images. The addition of image sample N+2 was able to link all the images together.

The test at step 230 now compares the number of data in the image link list, 5, to the threshold T. When the threshold is five or less for this example, process 200 executes step 235 to complete the registration. When the threshold T is greater than five for this example, process 200 continues to add new image samples and perform the matching, evaluating and testing of step 210 through step 230 until the test at step 230 passes.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A machine-implemented method for organizing a set of data derived from an N number of pattern representations from one or more single pattern sources, N>1, comprising executing on a processor the steps of:
    a) producing from the set of data using the processor, a first reference list identifying the N number of pattern representations $I_k$, k=1 to N, stored in a memory structure;
    b) applying, using the processor, responsive to said first reference list, a machine-implemented pattern matcher process to a first set of pairs of said pattern representations wherein said first set of pairs of said pattern representations includes a number M of unique two-combinations of said plurality of pattern representations taken two at a time, said applying step b) producing a MATCH result for each said unique two-combination when said unique two-combination is determined by said machine-implemented pattern matcher to match each other within a first predetermined level of confidence;
    c) recording, using the processor, each said MATCH result into said memory structure including a match matrix; and
    d) determining, using the processor, a total number of said MATCH results stored in said match matrix.

2. The machine-implemented method of claim 1 wherein said number M is equal to $(N*(N-1))/2$.

3. The machine-implemented method of claim 1 wherein said first predetermined level of confidence is a function of N.

4. The machine-implemented method of claim 2 wherein said first predetermined level of confidence is a function of N.

5. The machine-implemented method of claim 1 including a trusted mode operation and a non-trusted mode operation wherein said pattern matcher process includes a first mode for a trusted match process for producing, using the processor, said MATCH result at said first predetermined level of confidence, wherein said pattern matcher process includes a second mode for a non-trusted match process for producing, using the processor, said MATCH results at a second predetermined level of confidence different from said first predetermined level of confidence, wherein said applying a machine-implemented pattern matcher process operates during said trusted mode operation with said pattern matcher process operating in said first mode, further comprising:

applying, using the processor, said machine-implemented pattern matcher process operating in said second mode to said first set of pairs of said images when the method operates in said non-trusted mode operation, said second mode applying step producing, using the processor, a MATCH result for each said unique two-combination when said unique two-combination is determined by said machine-implemented pattern matcher to match each other within said second predetermined level of confidence.

6. The machine-implemented method of claim 5 wherein said number M is equal to (N*(N−1))/2.

7. The machine-implemented method of claim 5 wherein said first predetermined level of confidence is a function of N.

8. The machine-implemented method of claim 6 wherein said first predetermined level of confidence is a function of N.

9. The machine-implemented method of claim 1 wherein the set of data is derived from an additional L number of pattern representations from the one or more single pattern sources, L greater than or equal to 1, comprising:

producing using the processor, from the set of data after steps a)-d) are completed, a second reference list identifying the N+L number of pattern representations $I_k$, k=1 to N+L, stored in said memory structure;

applying, using the processor responsive to said reference list, a machine-implemented pattern matcher process to a second set of pairs of said pattern representations wherein said second set of pairs of said pattern representations includes a number P of unique two-combinations of said plurality of pattern representations taken two at a time and excluding said unique two-combinations of said plurality of pattern representations of said first set of pairs of pattern representations, said applying step f) producing, using the processor, a MATCH result for each said unique two-combination when said unique two-combination is determined by said machine-implemented pattern matcher to match each other within a first predetermined level of confidence;

recording, using the processor, each said MATCH result into said match matrix; and determining, using the processor, a total number of said MATCH results stored in said memory structure.

10. The machine-implemented method of claim 1 wherein a set of non-matching unique two-combinations have an associated entry in said match matrix indicating a non-match.

11. The machine-implemented method of claim 1 further comprising:

encoding, using the processor, the set of data and said match matrix into a template.

12. The machine-implemented method of claim 1 wherein the pattern sources include a human finger defining a fingerprint.

13. The machine-implemented method of claim 1 wherein said pattern representation includes an image from a pattern imager imaging one of the pattern sources.

14. The machine-implemented method of claim 12 wherein said pattern representation includes an image from a fingerprint imager imaging one of the fingerprint.

15. The machine-implemented method of claim 13 wherein said pattern imager includes a sensor.

16. The machine-implemented method of claim 14 wherein said fingerprint imager includes a sensor.

17. The machine-implemented method of claim 16 wherein the fingerprint has a characteristic size dimension, wherein said sensor has an imaging area smaller than said characteristic size dimension, and wherein said fingerprint representations include a plurality of different portions of the fingerprint.

18. An apparatus for organizing a set of data derived from an N number of pattern representations from one or more single pattern sources, N>1, comprising:

a pattern collector producing the N number of pattern representations; and a processing system, coupled to said pattern collector, including a processor and a memory coupled to said processor, said memory storing a plurality of computer executable instructions wherein said processor executes said plurality of computer executable instructions to perform a method, comprising:

producing from the set of data using the processor, a first reference list identifying the N number of pattern representations $I_k$, k=1 to N, stored in a memory structure;

applying, using the processor and responsive to said first reference list, a machine-implemented pattern matcher process to a first set of pairs of said pattern representations wherein said first set of pairs of said pattern representations includes a number M of unique two-combinations of said plurality of pattern representations taken two at a time, said applying step b) producing, using the processor, a MATCH result for each said unique two-combination when said unique two-combination is determined by said machine-implemented pattern matcher to match each other within a first predetermined level of confidence;

recording, using the processor, each said MATCH result into said memory structure including a match matrix; and determining, using the processor, a total number of said MATCH results stored in said match matrix.

19. The apparatus of claim 18 wherein said number M is equal to (N*(N−1))/2.

20. The apparatus of claim 18 wherein said first predetermined level of confidence is a function of N.

21. The apparatus of claim 18 wherein the set of data is derived from an additional L number of pattern representations from the one or more single pattern sources, L greater than or equal to 1, the method further comprising:

producing using the processor, from the set of data after steps a)-d) are completed, a second reference list identifying the N+L number of pattern representations $I_k$, k=1 to N+L, stored in said memory structure;

applying, using the processor and responsive to said reference list, a machine-implemented pattern matcher process to a second set of pairs of said pattern representations wherein said second set of pairs of said pattern representations includes a number P of unique two-combinations of said plurality of pattern representations taken two at a time and excluding said unique two-combinations of said plurality of pattern representations of said first set of pairs of pattern representations, said applying step f) producing, using the processor, a MATCH result for each said unique two-combination when said unique two-combination is determined by said machine-implemented pattern matcher to match each other within a first predetermined level of confidence;

recording, using the processor, each said MATCH result into said match matrix; and determining, using the processor, a total number of said MATCH results stored in said memory structure.

22. The apparatus of claim 18 wherein a set of non-matching unique two-combinations have an associated entry in said match matrix indicating a non-match.

23. The apparatus of claim 18, said method further comprising: encoding, using the processor, the set of data and said match matrix into a template.

24. The apparatus of claim 18 wherein the pattern sources include a human finger defining a fingerprint.

25. The apparatus of claim 18 wherein said pattern representation includes an image from a pattern imager imaging one of the pattern sources and wherein said pattern collector includes said pattern imager.

26. The apparatus of claim 24 wherein said pattern representation includes an image from a fingerprint imager imaging one of the fingerprint sources and wherein said pattern collector includes said fingerprint imager.

27. The apparatus of claim 25 wherein said pattern imager includes a sensor.

28. The apparatus of claim 26 wherein said fingerprint imager includes a sensor.

29. The apparatus of claim 28 wherein the fingerprint has a characteristic size dimension, wherein said sensor has an imaging area smaller than said characteristic size dimension, and wherein said fingerprint representations include a plurality of different portions of the fingerprint.

30. A non-transitory computer readable medium with computer executable instructions stored thereon executed by a processor to perform the method of organizing a set of data derived from an N number of pattern representations from one or more single pattern sources, N>1, the method comprising:

producing from the set of data using the processor, a first reference list identifying the N number of pattern representations $I_k$, k=1 to N, stored in a memory structure;

applying, using the processor responsive to said first reference list, a machine-implemented pattern matcher process to a first set of pairs of said pattern representations wherein said first set of pairs of said pattern representations includes a number M of unique two-combinations of said plurality of pattern representations taken two at a time, said applying step b) producing, using the processor, a MATCH result for each said unique two-combination when said unique two-combination is determined by said machine-implemented pattern matcher to match each other within a first predetermined level of confidence;

recording, using the processor, each said MATCH result into said memory structure including a match matrix; and determining, using the processor, a total number of said MATCH results stored in said match matrix.

* * * * *